United States Patent [19]

Winzeler

[11] 3,894,603
[45] July 15, 1975

[54] VEHICLE DRIVE TRAIN
[75] Inventor: James E. Winzeler, East Peoria, Ill.
[73] Assignee: Caterpillar Tractor Co., Peoria, Ill.
[22] Filed: July 22, 1974
[21] Appl. No.: 490,910

Related U.S. Application Data
[63] Continuation of Ser. No. 284,488, Aug. 29, 1972, abandoned.

[52] U.S. Cl.................. 180/53 R; 74/15.63; 74/361
[51] Int. Cl........................................... B60k 25/00
[58] Field of Search.......... 180/51, 70, 53 R, 53 FF; 74/361, 15.6, 15.63, 15.66, 15.82; 417/231

[56] References Cited
UNITED STATES PATENTS
| | | | |
|---|---|---|---|
| 1,364,325 | 1/1921 | Sitney | 74/361 |
| 2,594,695 | 4/1952 | Storey | 180/51 |
| 2,601,297 | 6/1952 | Keese | 180/53 R |
| 2,762,230 | 9/1956 | Meyer | 74/361 |
| 2,949,162 | 8/1960 | Davis | 180/53 R X |

Primary Examiner—Kenneth H. Betts
Attorney, Agent, or Firm—Phillips, Moore, Weissenberger, Lempio & Strabala

[57] ABSTRACT

A compact vehicular drive train including a prime mover or engine with a multispeed transmission arranged below the engine, a transfer gear assembly coupling a flywheel of the engine with the transmission and an accessory power output shaft coaxially coupled to the flywheel along with an input gear for the transfer gear assembly. A compact embodiment of such a transfer gear assembly includes a pair of directional input gears in meshing engagement with each other, one of them also being in meshing engagement with the input gear, the directional input gears being arranged for selective coupling with a transfer output gear.

4 Claims, 4 Drawing Figures

VEHICLE DRIVE TRAIN

This is a continuation of application Ser. No. 284,488, filed Aug. 29, 1972, now abandoned.

BACKGROUND OF THE INVENTION

The present invention relates to a compact vehicular drive train and more particularly to a drive train of the type having a transfer gear assembly for coupling an engine or prime mover into the drive train and an accessory power output shaft for driving accessory equipment associated with the engine.

As demonstrated by a preferred embodiment described in greater detail below, one example of a vehicular drive train towards which the present invention is directed is the engine or prime mover and associated drive components for a motor grader. However, it will be apparent that the invention is also adaptable to the other types of vehicles. A conventional engine arrangement in motor graders includes a engine mounted at the rear of the grader vehicle with a multispeed transmission arranged ahead of and below the engine, a transfer gear assembly being arranged forwardly of the engine to couple the engine with the transmission. Within such a conventional arrangement, a radiator has commonly been placed at the rearward end of the vehicle. An accessory power output shaft has also been mounted to extend from the rear of the engine to drive a cooling fan associated with the radiator and accessory hydraulic pumps for example.

SUMMARY OF THE INVENTION

It is an object of the present invention to provide a compact drive train adaptable to vehicles of the type described above. One particular feature of the invention comprises the arrangement of a multispeed transmission below the engine with a transfer gear assembly coupling the engine or prime mover with the multispeed transmission. A transfer input gear for the transfer gear assembly and an accessory power output shaft are coaxially coupled with flywheel means at one end of the engine to permit a particularly compact arrangement of the drive train.

As emphasized by the preferred embodiment described below, it is particular contemplated that the compact drive train of the present invention be adaptable to an articulated vehicle.

It is also an object of the present invention to provide a compact transfer gear assembly for vehicular drive trains. Such a transfer gear assembly comprises a transfer input gear coupled with flywheel means of a prime mover, a pair of directional input gears being in meshing engagement with each other, one of the directional input gears being in meshing engagement with the transfer input gear as well with the two directional input gears being adapted for selective coupling with a transfer output gear.

Additional objects and advantages of the present invention are made apparent in the following description having reference to the accompanying drawings.

DETAILED DESCRIPTION OF THE INVENTION

Figure 1:
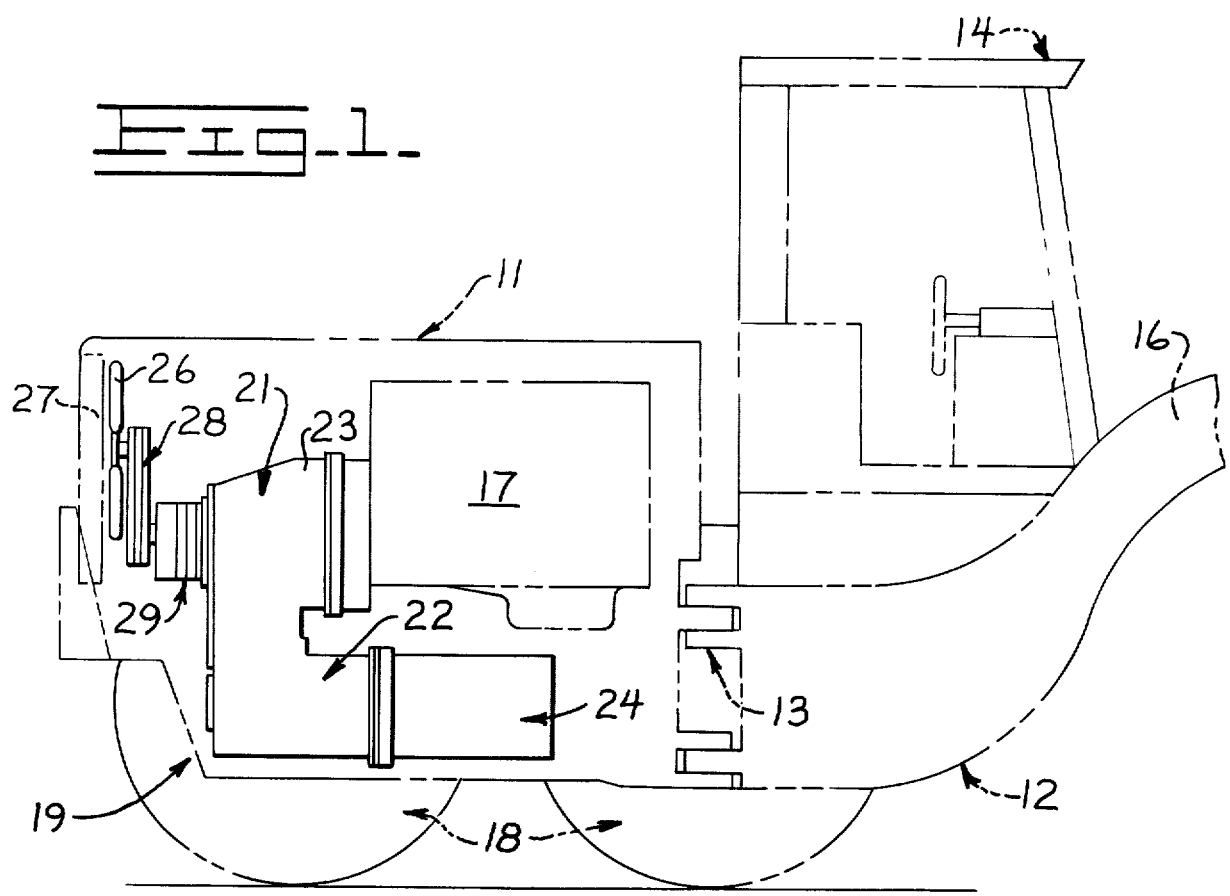
FIG. 1 is a side view in elevation of a portion of a motor grader vehicle to illustrate arrangement of a drive train therein.

Referring particularly to FIG. 1, a motor grader has a rear section 11 and a forward section 12 secured together about a vertical axis of articulation provided by a coupling 13. An operator's station 14 is arranged on the forward articulated section. The forward wheels, the blade and the blade mounting ring are omitted from the drawing in FIG. 1 along with the forward extension of the beam 16 to permit the showing of greater detail in the rearward articulated section 11. The articulated section 11 includes the entire drive train toward which the present invention is particularly directed.

The articulated section 11 includes a prime mover or engine 17 together with a plurality of wheels 18 which support the vehicle section 11 and are driven by the engine 17. A drive train 19 for coupling the engine 17 with the wheels 18 includes a transfer gear assembly 21 and a multispeed transmission 22 both arranged within a transfer gear housing 23, a differential 24 being arranged below the engine 17 for coupling the transfer gear assembly and multispeed transmission with the wheels 18 in a generally conventional manner.

Auxiliary equipment driven by the engine 17 includes a fan 26 associated with a radiator 27. Additional auxiliary equipment such as an alternator (not shown) and various hydraulic pumps such as that indicated at 29 for supplying fluid under pressure to the multispeed transmission 22, may also be driven by the engine 17.

It may be particularly noted in FIG. 1 that one end of the engine 17 is arranged substantially adjacent the articulated coupling 13 of the vehicle with the transfer gear assembly 21 and the various auxiliary components being coupled to the other end of the engine.

Figure 2:
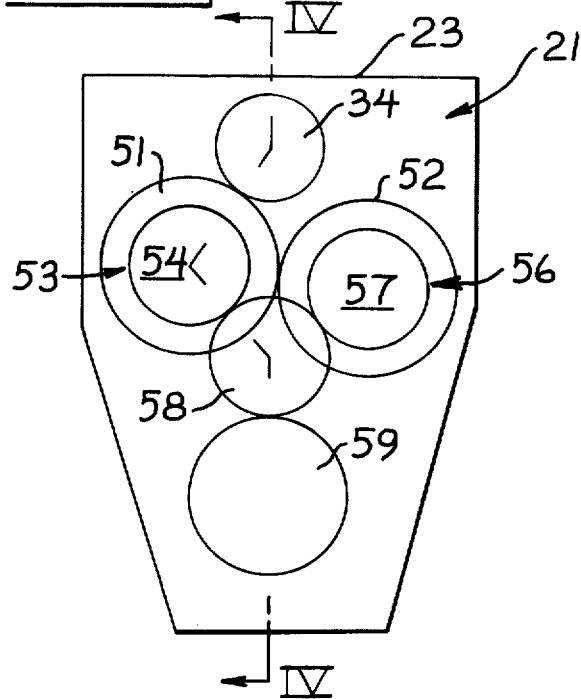
FIG. 2 is a generally schematic representation of a transfer gear assembly for such a drive train, viewed for example from the left end of the vehicle in FIG. 1.
Figure 3:
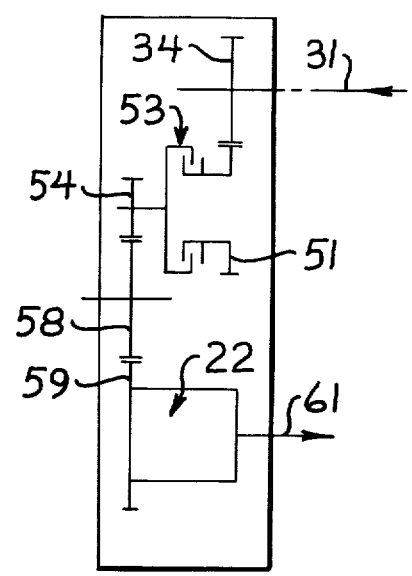
FIG. 3 is a schematic representation of the transfer gear assembly as viewed for example from one side of FIG. 2.

Referring now particularly to FIG. 1 as well as FIGS. 2 and 3, the engine 17 includes a flywheel 31 coupled to a crankshaft 32 for the engine. A conical drive adapter 33 is in turn secured to the flywheel 31.

The transfer gear assembly 21 includes a transfer input gear 34 splined at 36 to the adapter 33 and supported by bearings 37 and 38 by portions of the transfer gear assembly housing 23. An accessory power output shaft 41 is coaxially coupled to the input gear 34 and accordingly to the adapter 33 and flywheel 31 by means of a coupling 42. The shaft 41 drives the pump 29 as well as a pulley 43 which drives the fan 26 and other accessory items through a plurality of v-belts 28 shown in FIG. 1.

Returning again to the transfer gear assembly 21, a pair of directional input gears 51 and 52 (see FIG. 2) are arranged for rotation in meshing engagement with each other, the directional input gear 51 also being in meshing engagement with the transfer gear 34. In the present embodiment, the directional input gear 51 provides for forward operation of the vehicle while the other directional input gear 52 provides for reverse operation in a manner described in greater detail below.

A forward direction clutch 53 selectively couples the forward input gear 51 with a clutch output gear 54 while a reverse directional clutch 56 selectively couple the reverse input gear 52 with a clutch output gear 57. Both of the clutch output gears 54 and 57 mesh with an idler gear 58 which in turn meshes with an input carrier 59 for the multispeed transmission 22 (see FIGS. 1 and 3).

Figure 4:
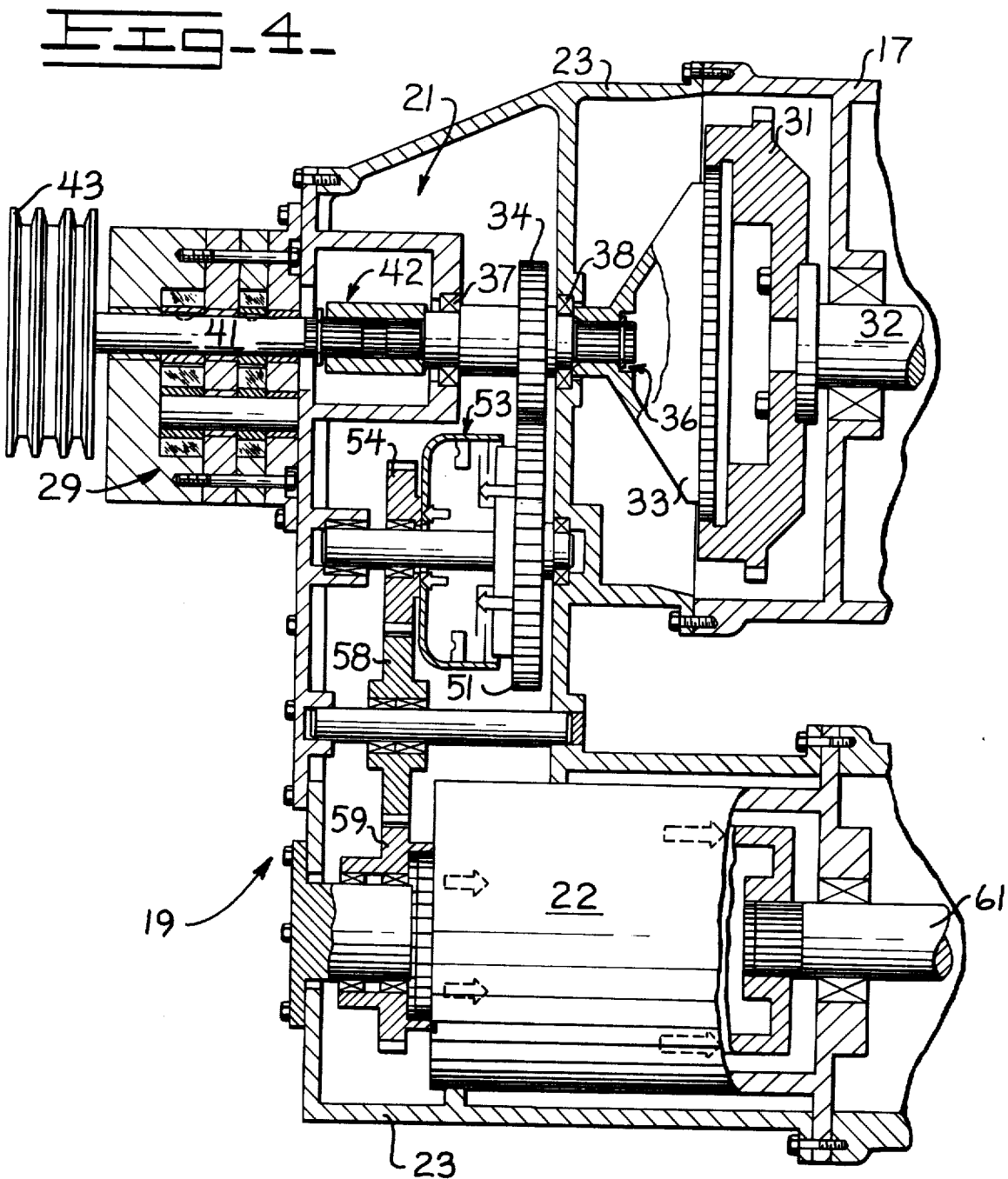
FIG. 4 is a centrally sectioned view of a transfer gear assembly together with other portions of a drive train suitable for use in a vehicle of the type illustrated in FIG. 1.

As illustrated in FIG. 4, the various gears and clutch components of the transfer gear assembly are suitably mounted for example by means of various bearings, along with the multispeed transmission 22 within the transfer gear assembly housing 23. As illustrated in FIG. 4 and also in FIG. 3, an output shaft 61 of the multispeed transmission 22 is connected to internal gearing (not shown) to the differential 24 which is coupled with the ground wheels 18 in a generally conventional manner.

What is claimed is:

1. A compact drive train for a vehicle comprising
   a prime mover arranged adjacent one end of the vehicle with a multi-speed transmission means disposed below the prime mover,
   a transfer gear assembly for coupling a flywheel means of the prime mover with the transmission means and including
   a transfer input gear coaxially coupled with the flywheel means,
   transfer gear means meshing with the transfer input gear and coupled with the transmission means, said transfer means comprising a pair of directional input gears in meshing relation with each other, one of the directional input gears being in meshing engagement with the transfer input gear, a transfer output gear providing a power input for the transmission means,
   clutch means selectively coupling the respective directional input gears with the transfer output gear, said clutch means including a directional output gear coaxially arranged with each respective directional input gear, and an idler gear arranged in meshing engagement with the two directional output gears and the transfer output gear, and
   an accessory power output shaft coaxially coupled with the transfer input gear,
   the accessory power output shaft, the transfer input gear and the flywheel all being arranged at one end of the prime mover.

2. The compact drive train of claim 1 wherein the transfer output gear is a carrier element for the multispeed transmission means.

3. The compact drive train of claim 2 wherein the vehicle has two sections secured together at a vertical axis of articulation, the prime mover being disposed upon one of the articulated sections with one end adjacent the axis of articulation, the transfer input gear and the flywheel being arranged at the opposite end of the prime mover.

4. The transfer gear assembly of claim 1 wherein the directional clutch input gears are larger than the transfer input gear to provide gear reduction in the transfer gear assembly.

* * * * *